US008020579B2

(12) United States Patent
Ruhs (10) Patent No.: US 8,020,579 B2
(45) Date of Patent: Sep. 20, 2011

(54) FIRE HYDRANT SECURITY CAP CLOSURE SYSTEM

(76) Inventor: Jack Ruhs, Palm City, FL (US)

( * ) Notice: Subject to any disclaimer, the term of this patent is extended or adjusted under 35 U.S.C. 154(b) by 491 days.

(21) Appl. No.: 12/155,466

(22) Filed: Jun. 4, 2008

(65) Prior Publication Data

US 2009/0301571 A1 Dec. 10, 2009

(51) Int. Cl.
  *E03B 9/06* (2006.01)
  *F16K 35/16* (2006.01)
(52) U.S. Cl. ......... 137/296; 137/384.2; 251/65; 70/178; 320/107; 320/114; 81/52
(58) Field of Classification Search .................. 137/296, 137/272, 294, 315.41, 384.2; 251/65; 70/178, 70/167, 169; 81/479, 467, 52, 478; 320/107, 320/108, 114, 137
See application file for complete search history.

(56) References Cited

U.S. PATENT DOCUMENTS

| | | | | |
|---|---|---|---|---|
| 4,182,361 A | * | 1/1980 | Oakey | 137/296 |
| 5,072,750 A | * | 12/1991 | Poms et al. | 137/296 |
| 6,089,253 A | * | 7/2000 | Stehling et al. | 137/296 |
| 6,694,783 B2 | * | 2/2004 | Trempala | 70/167 |

* cited by examiner

*Primary Examiner* — Kevin Lee
(74) *Attorney, Agent, or Firm* — Sam Silverberg (57) ABSTRACT

This invention provides a fire hydrant security system having an inner cap with an outlet port on a fire hydrant in a fixed position which includes a member capable of extending from the periphery of the inner cap into a slot in the inner part of an outer cap wherein the member's position can be retracted and retained in the inner cap, wherein said outer cap can be attached to the inner cap so that the outer cap can spin freely with respect to the inner cap, and a key wrench that's fits over the outer cap for aligning the outer cap and the key wrench in a fixed position so that a magnet located on the wall of the key wrench can be aligned with a slot on inner wall of the outer cap and wherein the rotation of the key wrench causes the magnet to align with the member and to extend the member into the slot on the inside of the outer cap thereby joining the outer cap to the inner cap.

19 Claims, 7 Drawing Sheets

WATER VALVE FITTING
KEY WRENCH & TORQUE BAR
GPS MODULE

GPS MODULE & CHARGING CRADLE

FIG - 6

FIRE HYDRANT SECURITY CAP CLOSURE SYSTEM

FIELD OF THE INVENTION

This invention relates to the problem of making our public water supply safer by protecting the access to the water supply through the fire hydrants in public places.

BACKGROUND OF THE INVENTION

Figure 1:
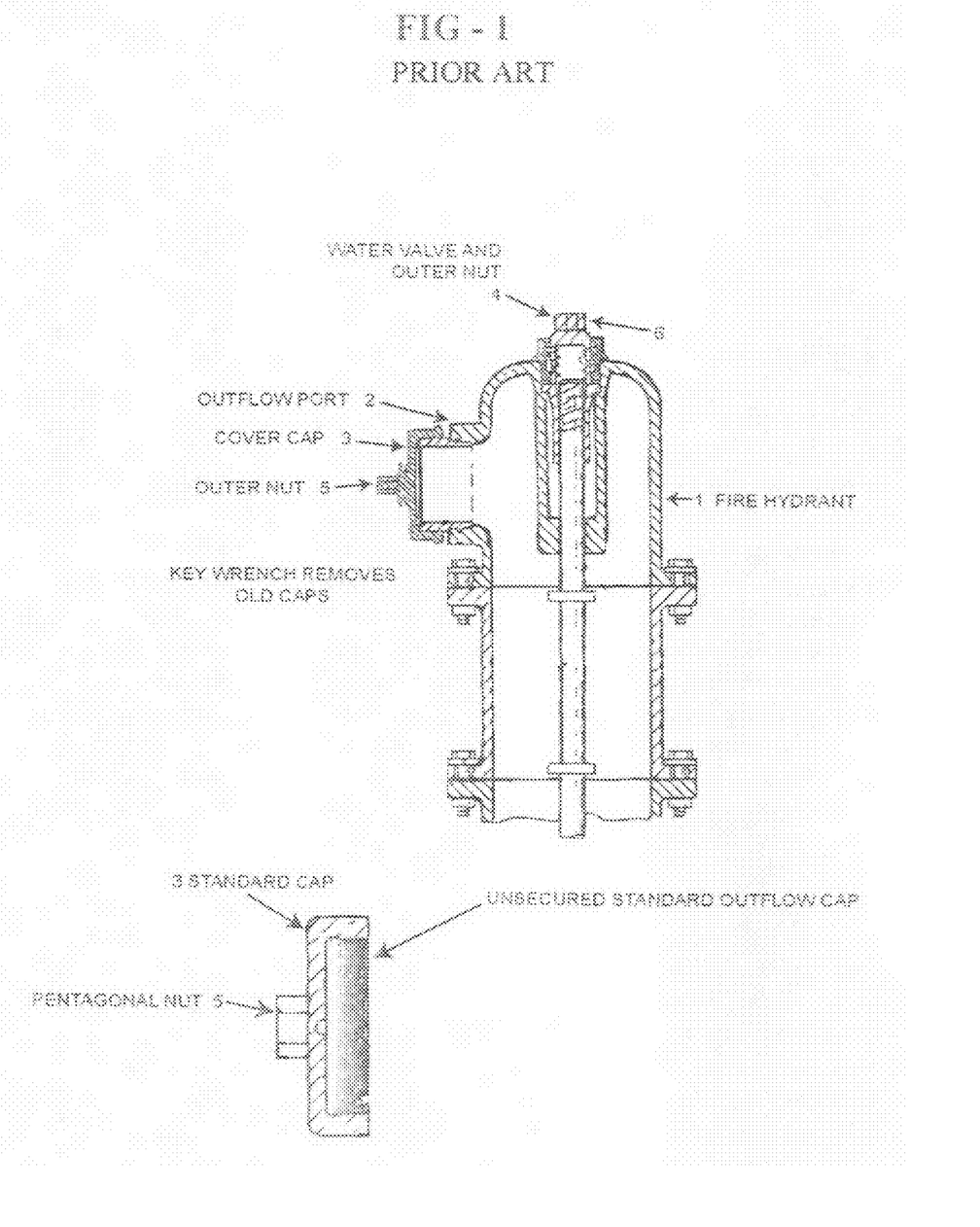
FIG. 1 shows a prior art fire hydrant.

FIG. 1 shows a conventional fire hydrant 1 having an outflow port 2 which is protected by a cap 3 and a water valve 4. The same type of tool can be used to turn nuts 5 and 6. Turning the nut 5 removes the outflow port cover and turning nut 6 opens the water valve to allow the water to flow through the outflow port 2. Because these caps can be removed with readily available tools, such as a pipe key or spanner wrench the conventional lids or covers are not sufficiently protected from unauthorized access.

The prior art has made many attempt to provide a secure cap for fire hydrant. U.S. Pat. No. 5,072,750 filed on Dec. 17, 1991, which is incorporated by reference in the entirety, shows a rotating cap that uses a magnet wrench to attach the cap to a plate that allows the cap to be removed from a fire hydrant. The art has recognized a need for a locking cap that cannot easily be duplicated and can be protected against lose or theft.

SUMMARY OF THE INVENTION

The objective of this invention is to provide a means to prevent theft of water, cap theft, and terrorist access to the water supply. The cap can spin freely and is difficult to remove with conventional tools. A unique key wrench, designed to mate with the cap, is used to provide security to hydrants. A tracking device such as a GPS unit can be inserted into the key wrench for locating the key wrench should it be lost or stolen. When the key wrench is not in use, a cradle can be used to charge the battery of the GPS unit.

The objective of this invention can be achieved by providing a fire hydrant security system with an inner cap having means for attaching an outlet port of a fire hydrant in a fixed position which includes a member capable of extending from the periphery of the inner cap into a slot in the inner part of an outer cap and having means for retracting and retaining the position of the member in the inner cap, wherein said outer cap includes means for attaching the outer cap to the inner cap so that the outer cap can spin freely with respect to the inner cap, and a key wrench having means for fitting the key wrench over the outer cap and for aligning the outer cap and key wrench in a fixed position wherein the key wrench has a magnet located on the wall of the key wrench that becomes aligned with a slot on inner wall of the outer cap and wherein the rotation of the key wrench causes the magnet to align with the member and to extend the member into the slot on the inside of the outer cap thereby joining the outer cap to the inner cap.

DETAILED DESCRIPTION OF THE INVENTION

Figure 2:
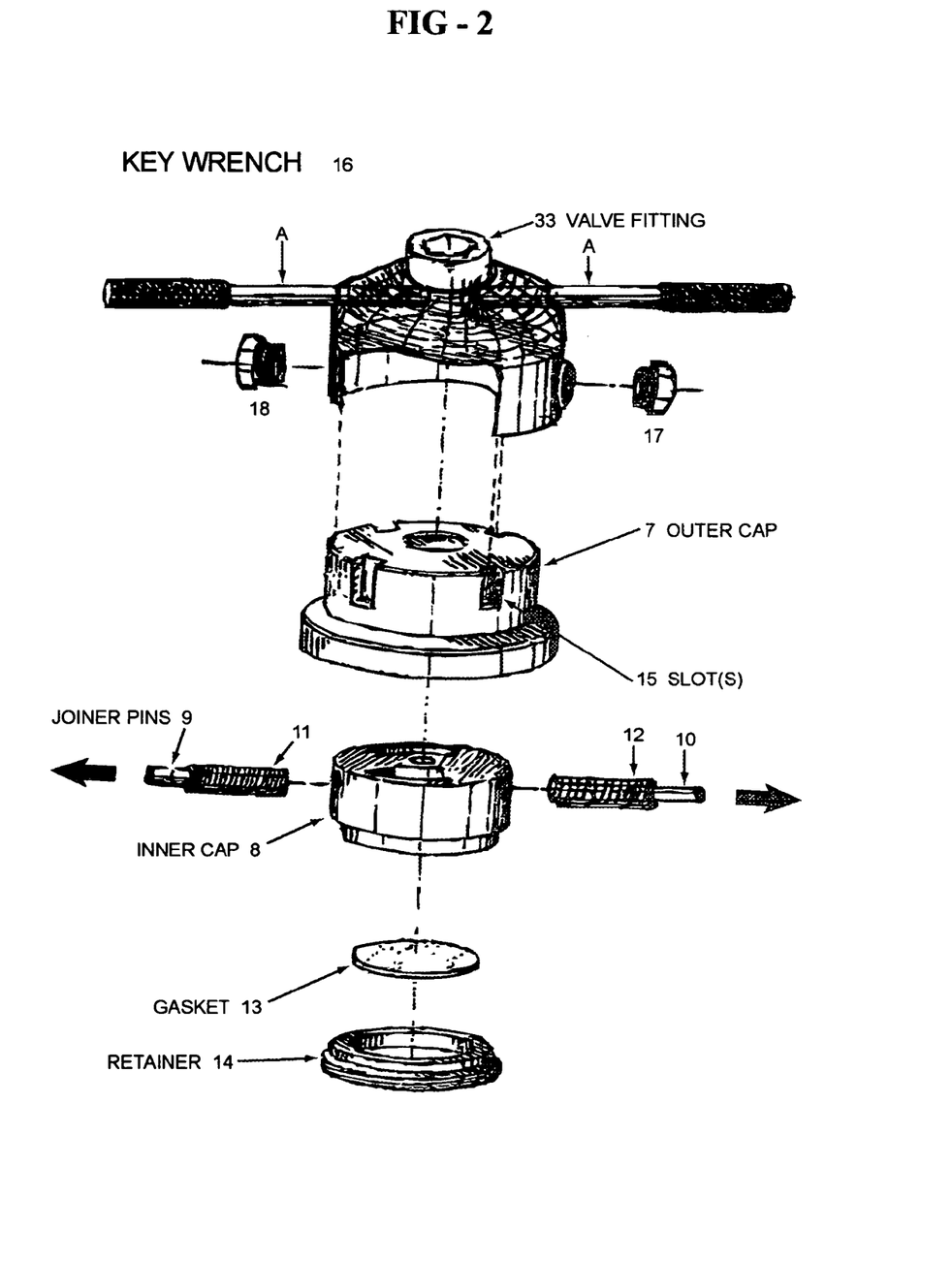
FIG. 2 shows a key wrench and outer cap and inner cap assembly.
Figure 3A:
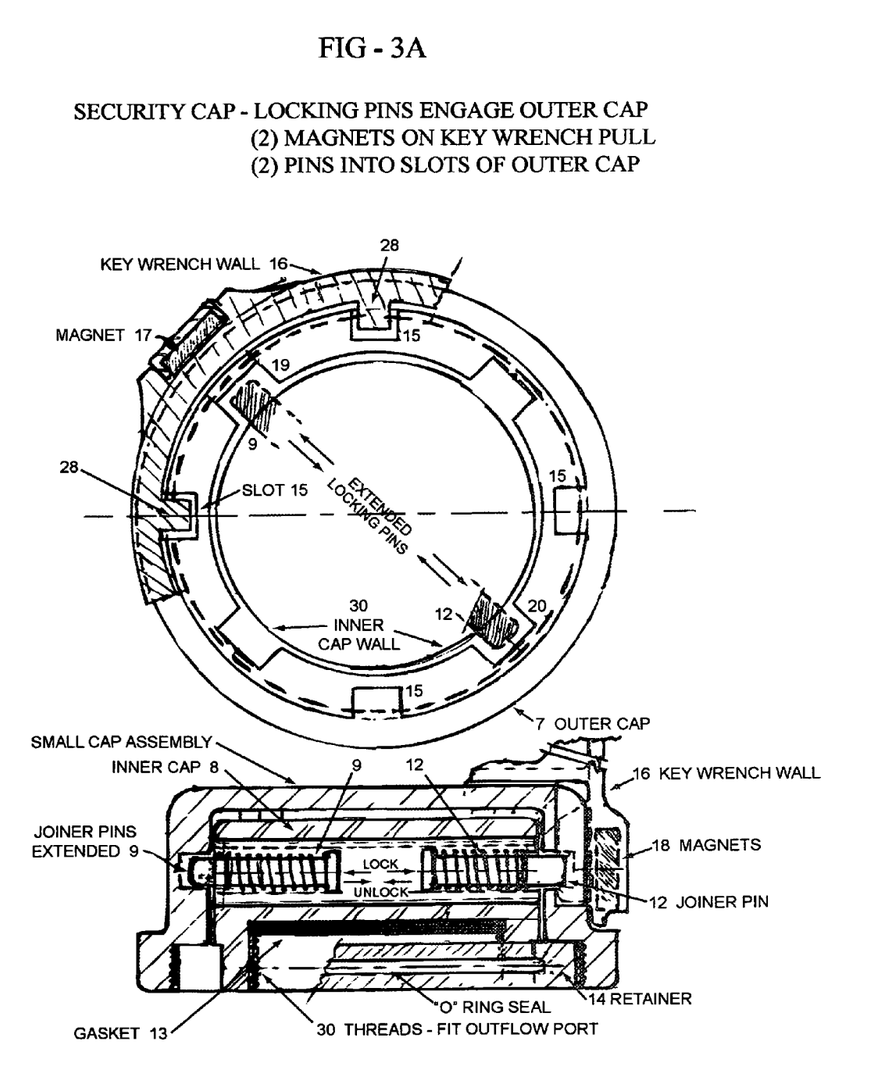
FIGS. 3A and 3B shows how the inner cap is jointed to the outer cap.
Figure 3B:
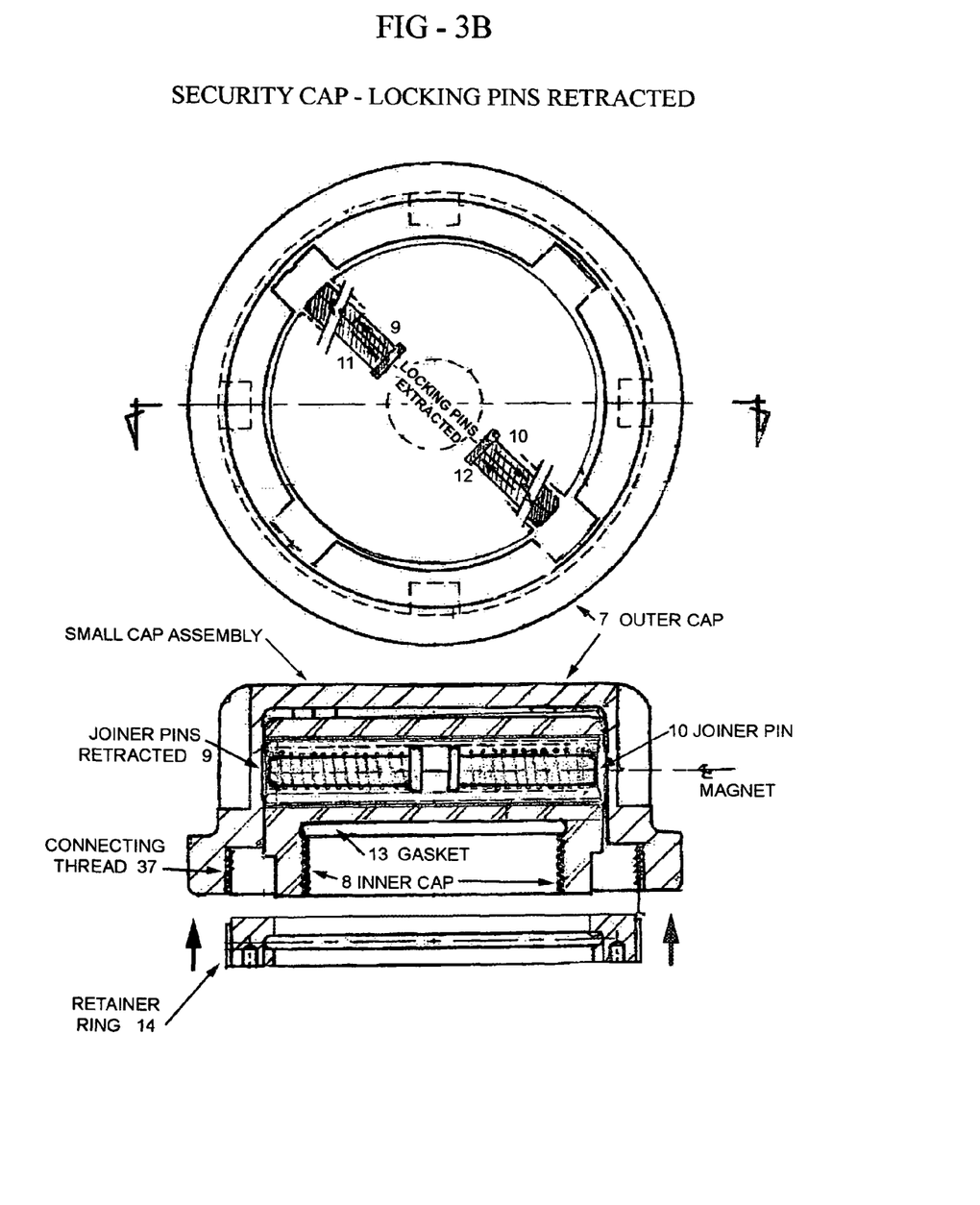

FIGS. 2, 3A and 3B show an outer cap 7 that spins on inner cap 8. Inner cap 8 and outer cap 7 are joined with means for retaining and allowing outer cap 7 to spin freely around inner cap 8. Inner cap 8 has joiner pins 9 and 10 that are restrained from extending in from the periphery of the inner cap peripherally extending in a radial direction from the center of the cap by springs 11 and 12. FIG. 3A shows inner cap 8 having threads 32 for closing outlet port 2

The outer cap 7 has slots 15 those mates with the protrusions 28 on the inner wall of key wrench 16 when key wrench 16 fits over outer cap 7. When the protrusions 28 are mated with the slots the key wrench can turn the outer cap. Preferably there are 4 slots cut into the periphery of the inner cap at 90 degrees spacing for joining the key wrench with the outer cap. The term slot includes any narrow opening or groove or hole.

Retainer ring 14 has threads that mate with the threads 37 on the outer cap 7. Once the retaining ring is threaded on the outer cap, the outer cap is maintained in its proper position and will allow the outer cap to spin around the inner cap. Other conventional retaining means such as a groove with a ring can be used to join the inner cap to the outer cap. The gasket 13 prevents fluids from flowing between the inner cap and the outlet port.

The mating of the key wrench 16 to the outer cap allows magnets 17 and 18 to be aligned with slots 19 and 20 on the inner wall of the outer cap. When the key wrench rotates the outer cap, the joiner pins 9 and 10 will become aligned with slots 19 and 20 and become axially aligned with magnets 17 and 18. These magnets overcome the tension of springs 11 and 12 and move joiner pins 9 and 12 in a radial direction until they extend into slots 19 and 20 thereby joining the inner cap with the outer cap. When the key wrench is removed from the cap, the compressed springs retract the two extended joiner pins out of the slots 19 and 20 and back into inner cap to its original position allowing the outer cap to spin freely around the inner cap.

Figure 4A:
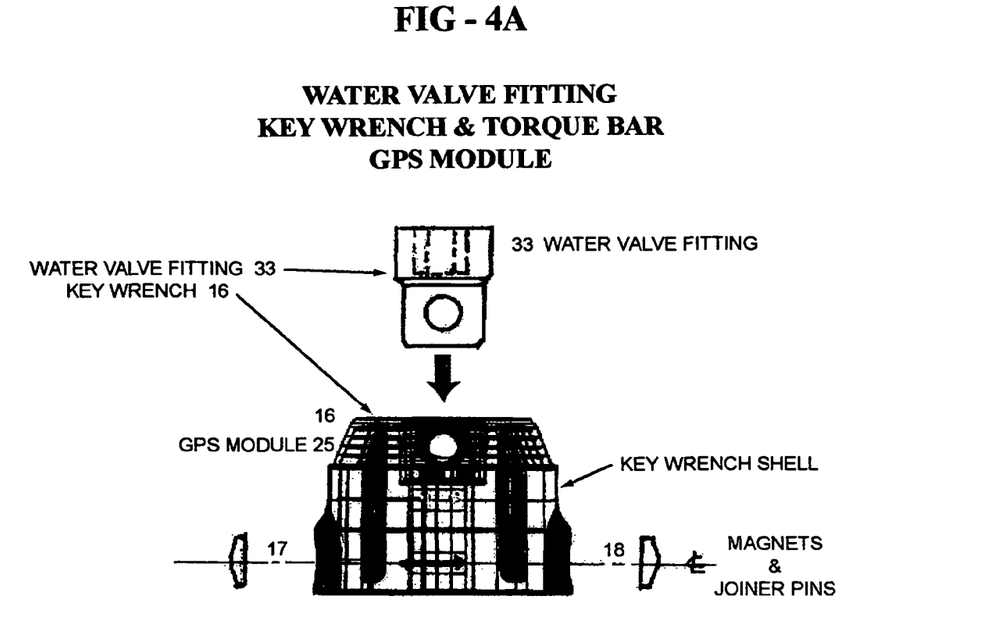
FIGS. 4A and 4B shows show a key wrench assembly with a GPS module.
Figure 4B:
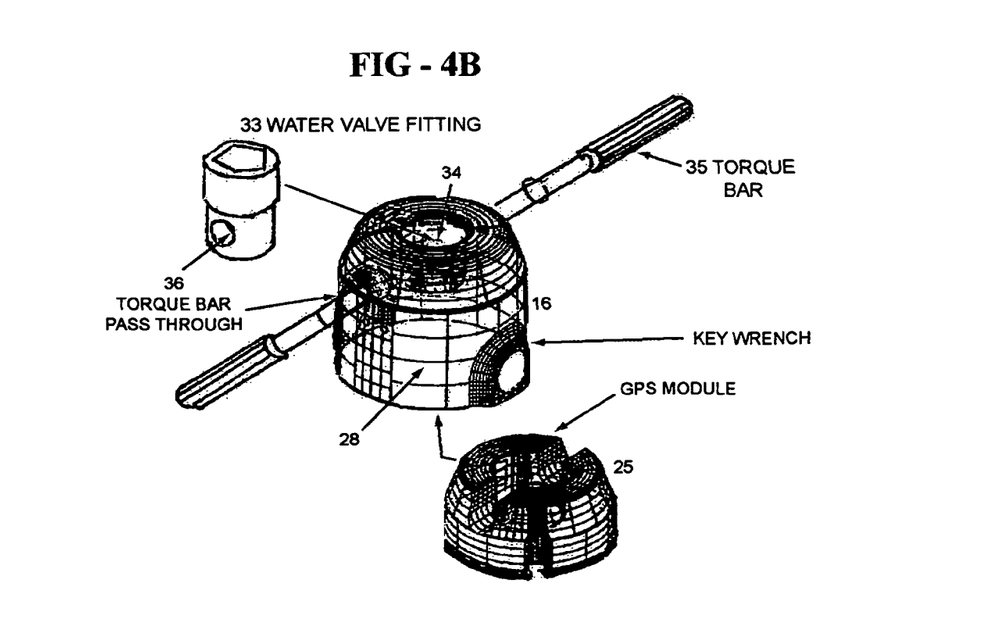

FIGS. 4A and 4B show the key wrench assembly. The top of the key wrench has opening 34 where a water valve fitting 33 can be inserted. The fitting can be held in place with a torque bar 35 that can pass through the opening 36 in the key wrench. When the key wrench and the outer cap and inner cap are magnetically locked in place the key wrench cap can be inverted and placed on top of the nut so that the water valve fitting can turn the nut. This arrangement is shown in FIG. 12. This allows for the key wrench to rest in a fixed position while the fire hydrant is being used without the need of securing the cap with a chain.

The need for a proper alignment of the strong magnetic forces to overcome the spring tension and the separation distance of magnet and pin combine to make it extremely difficult to extend the pins without a specially designed key wrench. The need for a specially designed wrench makes the hydrant more secure.

To guarantee absolute security, the key wrench needs to be protected from loss or theft. To ensure this security, the key wrench housing has incorporated a tracking device which will emit several types of tracking signals to allow authorities to know its location. The tracking device can also emit an alert signal whenever motion is sensed such as when it is removed from the cradle 30. The tracking device can have a dual battery source for extended use without the need for daily charging. With a duel battery source, several days of signal emissions is possible to facilitate recovery in case the key wrench is misplaced or stolen.

The tracking device is housed in a module within the key wrench completely hidden from view. Because the tracking device needs to transmit a signal through the key wrench, the key wrench needs to be modified with a material that allows signal transmission. This can be done by having at least a portion of the key wrench be made of a material that would allow transmission of the tracking signal. A preferred embodiment is to construct the key wrench entirely of a material that will allow transmission in all directions. Such a material can include a polycarbonate with fiberglass which allows a GPS tracking signal to emit in all directions and provide the necessary high strength needed to be used as a key wrench. Additional benefits such as being safe from electrical shock, reduction in weight, and corrosion free, are achieved when the key wrench is made from a nonconductive material.

The key wrench has tracking device module such as a GPS module 25 with an antenna, a backup battery and contacts for charging the extra battery. The GPS module sits in the upper part of the key wrench and can be retained in proper position by any known fastening device. When the key wrench is on the outer cap 7 the GPS module usually does not make contact with the outer cap. The tracking device can be any device that allows the key wrench to be located by emitting a signal that can be tracked.

Figure 5:
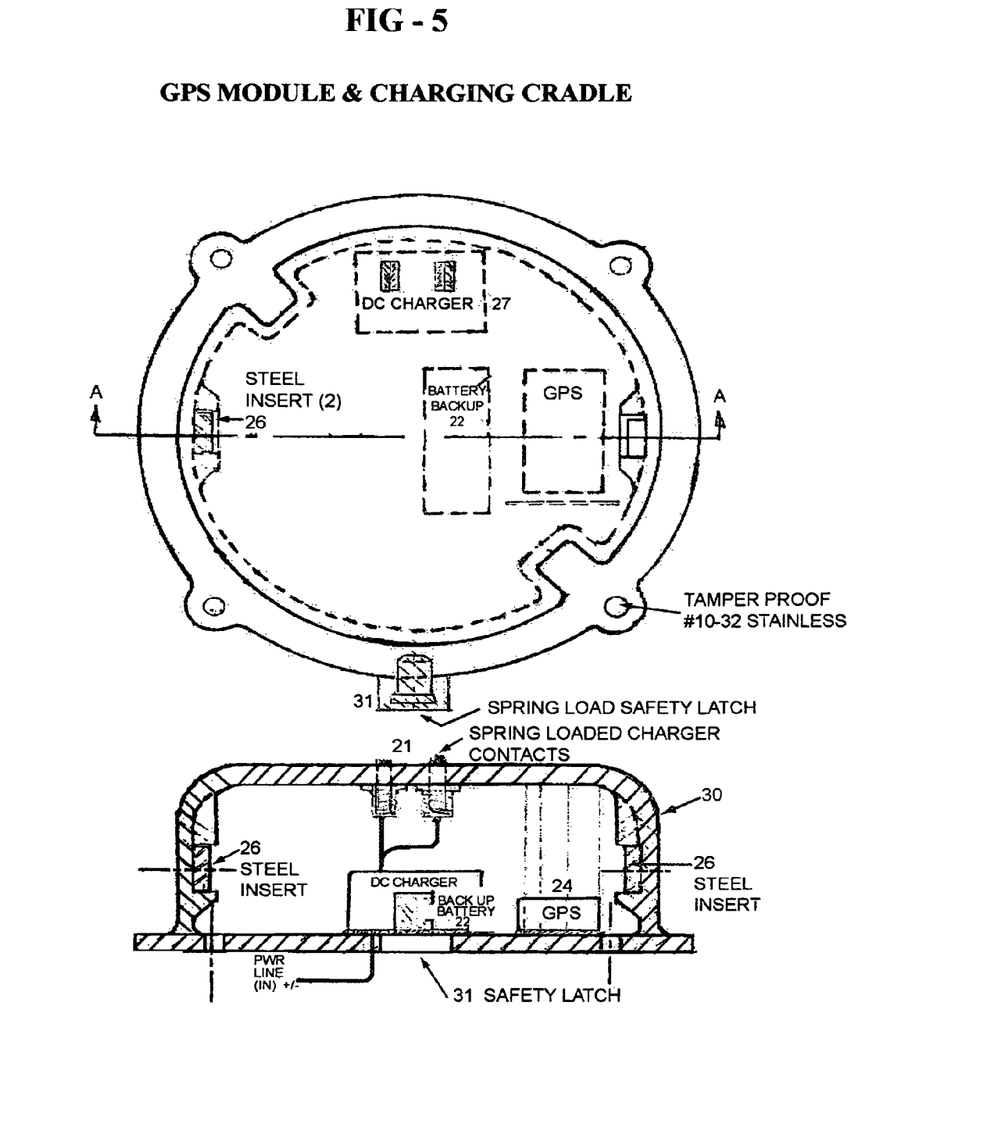
FIG. 5 shows a charging cradle.
Figure 6:
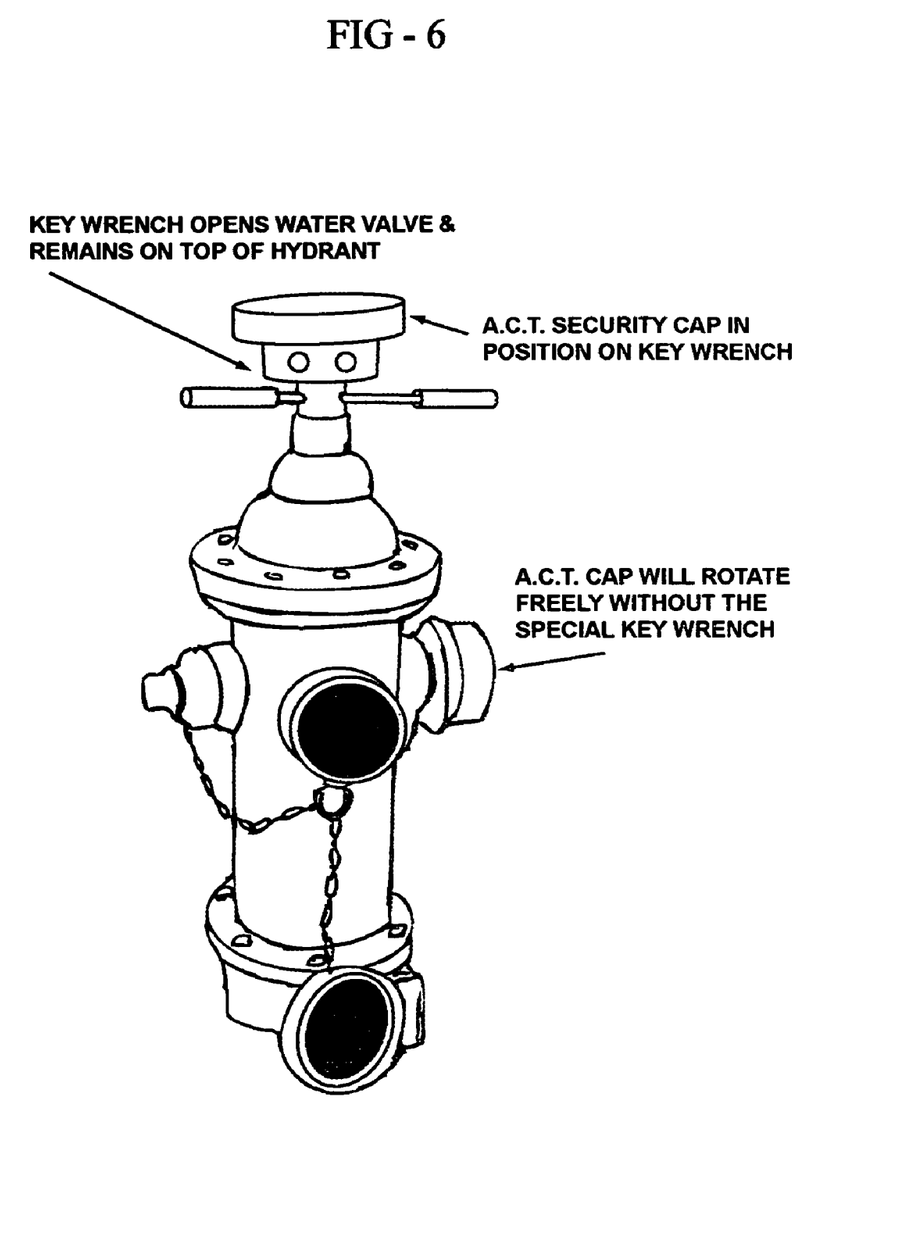
FIG. 6 shows security cap mounted on a fire hadrant

FIG. 5 shows a key wrench sitting on a cradle 30. The battery contacts makes contacts with spring loaded charger contacts 21 and presses the charger contacts so that the circuit to charger 27 is complete. The cradle 30 can have a separate tracking device such as a GPS unit 24 with an antenna 24 with a battery back up 22 that can be charged with DC charger 27 to provide the location of the cradle.

To insure that the key wrench sits properly on the cradle, alignment means can be used to ensure proper positioning. The alignment means can be the protrusions 28 on the inside of the key wrench and mating slots on the outside of the cradle. The proper positioning ensures that steel inserts 26 and magnets 17 and 18 align and that an electrical contact is made between charging contacts and the battery contacts of the GPS module. The alignment of the steel inserts and the magnets pulls the key wrench over the cradle and holds the key wrench in a desired position.

The charging cradle 30 can be constructed of the high strength polycarbonate w/glass. It can be mounted on the inside wall of a truck cab. A hidden safety latch 31 can be used to prevent unauthorized removal of the key wrench from the cradle.

The invention claimed is:

1. A fire hydrant security system comprising an inner cap having means for attaching an outlet port of a fire hydrant in a fixed potion and includes a member capable of extending from the periphery of the inner cap into a slot in the inner part of an outer cap and having means for retracting and retaining the position of the member in the inner cap, wherein said outer cap includes means for attaching the outer cap to the inner cap so that the outer cap can spin freely with respect to the inner cap, and a key wrench having means for fitting the key wrench over the outer cap and for aligning the outer cap and key wrench in a fixed position wherein the key wrench has a magnet located on the wall of the key wrench that becomes align with a slot on inner wall of the outer cap and wherein the rotation of the key wrench causes the magnet to align with the member and to extend the member into the slot on the inside of the outer cap thereby joining the outer cap to the inner cap.

2. A fire hydrant security system according to claim 1 wherein the member is extended in a radial direction from the periphery of the inner cap into the slot.

3. A fire hydrant security system according to claim 2 wherein the inner cap has two members in the form of pins and wherein the means for retracting and retaining the position of the pins includes springs that compress when the pins are extended.

4. A fire hydrant security system according to claim 2 wherein the key wrench has an inner wall and the means for fitting the key wrench over the outer cap and for aligning the outer cap and key wrench in a fixed position include a protrusion located on the inside wall of the key wrench that mates with a slot on the outside of the outer cap.

5. A fire hydrant security system according to claim 3 wherein the key wrench has a magnet that aligns with each pin for extending each pin into a slot in an inner part of the outer cap.

6. A fire hydrant security system according to claim 5 wherein the pins are located about 180 degrees apart in the inner cap.

7. A fire hydrant security system according to claim 1 wherein the top of the key wrench attaches to a water valve fitting that is capable of mating with a water valve nut on a fire hydrant.

8. A fire hydrant security system according to claim 1 wherein the key wrench has a tracking module inside the key wrench capable of transmitting a position signal.

9. A fire hydrant security system according to claim 8 wherein the entire key wrench is made out of a material that allows the tracking module to transmit signals through the key wrench.

10. A fire hydrant security system according to claim 1 including a cradle having an inner and outer wall for charging the key wrench having a tracking module wherein the cradle has means for charging a battery in the tracking module and wherein the key wrench has means for aligning the cradle and key wrench in a fixed position so that the means for charging the battery in the cradle can make electrical contact with the battery.

11. A fire hydrant security system according to claim 10 wherein the key wrench has an inner wall and wherein the means for aligning includes a protrusion on the inner wall of the key wrench that can mate with slots located on the outside wall of the cradle.

12. A fire hydrant security system according to claim 11 wherein the key wrench has magnets located on the wall of the key wrench and the cradle has metal inserts located on the inner wall of the cradle and wherein the means for aligning the cradle and key wrench in a fixed position aligns the magnets with the metal inserts.

13. A charging system for a key wrench having an inner wall and having a tracking module wherein the key wrench is capable of opening a cap on a fire hydrant comprising a cradle having an inner and outer wall and having means for charging a battery for a tracking module and a key wrench having an inner wall and having a tracking module having a battery located in the inside of the key wrench wherein the key wrench has means for aligning the cradle and key wrench in a fixed position so that the means for charging the battery in the cradle can make electrical contact with the battery.

14. A charging system for a key wrench according to claim 13 wherein the means for aligning includes a protrusion on the inner wall of the key wrench that can mate with a slot located on the outside wall of the cradle.

15. A charging system for a key wrench according to claim 14 wherein the key wrench has magnets located on the wall of the key wrench and the cradle has metal inserts located on the inner wall of the cradle and wherein the means for aligning the cradle and key wrench in a fixed position aligns the magnets and the metal inserts.

16. A cap for locking a fire hydrant outlet port comprising,
an outer cap having means for attaching the outer cap to an inner cap so that the outer cap can spin freely with respect to the inner cap, and
an inner cap having means for attaching in a fixed potion to an outlet port of a fire hydrant and includes a member capable of extending from the periphery of the inner cap into a slot in an inner part of the outer cap to join the inner cap to the outer cap and having means for retracting and retaining the position of the member in the inner cap.

17. A cap for locking a fire hydrant outlet port according to claim 16 wherein the member can be extended in a radial direction from the periphery of the inner cap into the slot.

18. A cap for locking a fire hydrant outlet port according to claim 17 wherein the inner cap has two members in the form of pins and wherein the means for retracting and retaining the position of the pins includes springs that compress when the pins are extended.

19. A cap for locking a fire hydrant outlet port according to claim 18 wherein the pins are located about 180 degrees apart in the inner cap.

* * * * *